_United States Patent_ [19]

Ruhnau et al.

[11] 4,166,976

[45] Sep. 4, 1979

[54] CIRCUIT FOR THE DIGITAL MEASUREMENT OF THE SPEED OF A MOVING OBJECT

[75] Inventors: Gerhard Ruhnau; Wolfgang Gudat, both of Hanover, Fed. Rep. of Germany

[73] Assignee: WABCO Westinghouse GmbH, Hanover, Fed. Rep. of Germany

[21] Appl. No.: 852,133

[22] Filed: Nov. 16, 1977

[30] Foreign Application Priority Data

Nov. 24, 1976 [DE]  Fed. Rep. of Germany ....... 2653351

[51] Int. Cl.$^2$ .............................................. G01P 3/48
[52] U.S. Cl. ..................................... 324/166; 364/565
[58] Field of Search ............... 324/166, 167, 168, 169, 324/170, 175, 178, 179, 180; 364/565

[56] References Cited

U.S. PATENT DOCUMENTS 4,056,287  11/1977  Gudat .................................. 364/565

_Primary Examiner_—Gerard R. Strecker
_Assistant Examiner_—Ernest F. Karlsen
_Attorney, Agent, or Firm_—J. B. Sotak; R. W. McIntire, Jr.

[57] ABSTRACT

A speed measuring circuit for digitally determining the angular speed of a rotating object employing a sensor and control unit for producing a sequence of signals proportional to the speed of the rotating object and for measuring the speed which is inversely proportional to the cycle duration. A storage register for storing a certain number of fixed values which are associated with certain speed values and which are graduated as preset of a predetermined speed measuring range. A comparator and control unit for comparing the cycle duration value measured each time with the fixed values and for setting the measured value equal to one of two successive speed step values when the measured value falls within the speed interval which is limited by the two successive speed step values.

14 Claims, 3 Drawing Figures

CIRCUIT FOR THE DIGITAL MEASUREMENT OF THE SPEED OF A MOVING OBJECT

FIELD OF THE INVENTION

The invention relates to a digital speed measurement circuit and more particularly to a circuit arrangement for digitally measuring the angular velocity of a rotating wheel employing a speed sensor for producing signals proportional to the velocity of the wheel, a control unit for measuring the cycle duration of the speed signals, a pulse generator for producing counting pulses, a digital counter for counting the pulses which fall within the cycle duration of the speed signals; storage, comparator and control units for ascertaining the speed of the rotating wheel by comparing the measured cycle duration time with stored fixed values by setting the measured value with one of two speed step values when the measured value falls within the speed interval which is limited to the two successive speed step values.

BACKGROUND OF THE INVENTION

There is shown and described in prior art arrangements, methods and apparatus, in which by performing dividing operations, the speed value corresponding to the cycle duration value measured is ascertained arithmetically. It will be appreciated that the use of serial techniques has the advantage that this method takes up relatively little space for construction, but has the disadvantage that it requires too much time to process the data. Thus, there is the danger that the time, which is predetermined by the duration of a cycle for measuring the speed value or the corresponding reciprocal value of the cycle duration and for producing the control signals, is not sufficient for the computation. When using parallel processing techniques, it is indeed possible to substantially shorten the computing time and to avoid the said danger of exceeding the time available, but only at the expense of a substantial constructional outlay which for economical reasons is not accept for use in motor vehicles or other wheeled carriers.

OBJECTS AND SUMMARY OF THE INVENTION

Accordingly, it is an object of the present invention to provide an improved digital method or procedure and a system or device of the type mentioned at the beginning in such a manner that a low cost for construction is realized, and the time necessary to obtain the reciprocal values of the cycle durations or the speed values can be kept so relatively short that the control signals can be produced at all times in a reliable manner within the time available which corresponds to about the cycle duration.

With respect to the procedure or method of digitally measuring the speed of a rotating object, this object is attained by sensing with a sensor which produces a sequence of signals proportional to the speed of the object, by measuring the cycle duration of the sensor signal frequency and by measuring the speed which is inversely proportional to the cycle duration, being characterized in that a certain number of values, which are associated with certain speed values and which are graduated as preset of a predetermined speed measuring range, are fixed and stored, and each value of the cycle duration is compared with the fixed values and is set equal to one of two successive speed step values when the measured value falls within the speed interval which is limited by the speed step values.

While with respect to the system or device, the object is obtained by employing a sensor for generating a sequence of signals proportional to the speed of a moving wheel, a measuring device for determining the cycle duration of the sensor signals which is provided with a pulse generator for producing counting pulses and with a digital counter for counting pulses which fall within the time duration of a cycle of a sensor signal, a measurement device for measuring the speed which is inversely proportional to the cycle duration, and characterized by a comparator for comparing the respective measured cycle duration value with preset values which corresond to specific quantities to graduated speed values of a predetermined speed measuring range. According to the invention, the speed values or reciprocal values which are needed to produce the control signals of the cycle durations measured are ascertained by comparing with preset values which are assigned to certain partial interval limits of a certain speed measuring range. Such a comparison is performed substantially more rapidly than a corresponding arithmetical operation for determining the speed in a serial operational process and, as far as time is concerned, is comparable with an arithmetical operation of the parallel processing technique. The overall electronic expenditure or outlay is small because digital storages in accordance with modern integration technology can be produced inexpensively in the form of standard units also for individual uses, do not have to be separately designed and manufactured, and are also suitable for vehicle operation. The graduations can be chosen so small that the error in quantization is negligible.

BRIEF DESCRIPTION OF THE DRAWINGS

The invention will now be further explained with reference to the accompanying drawings in which.

DETAILED DESCRIPTION OF THE INVENTION

Figure 1:
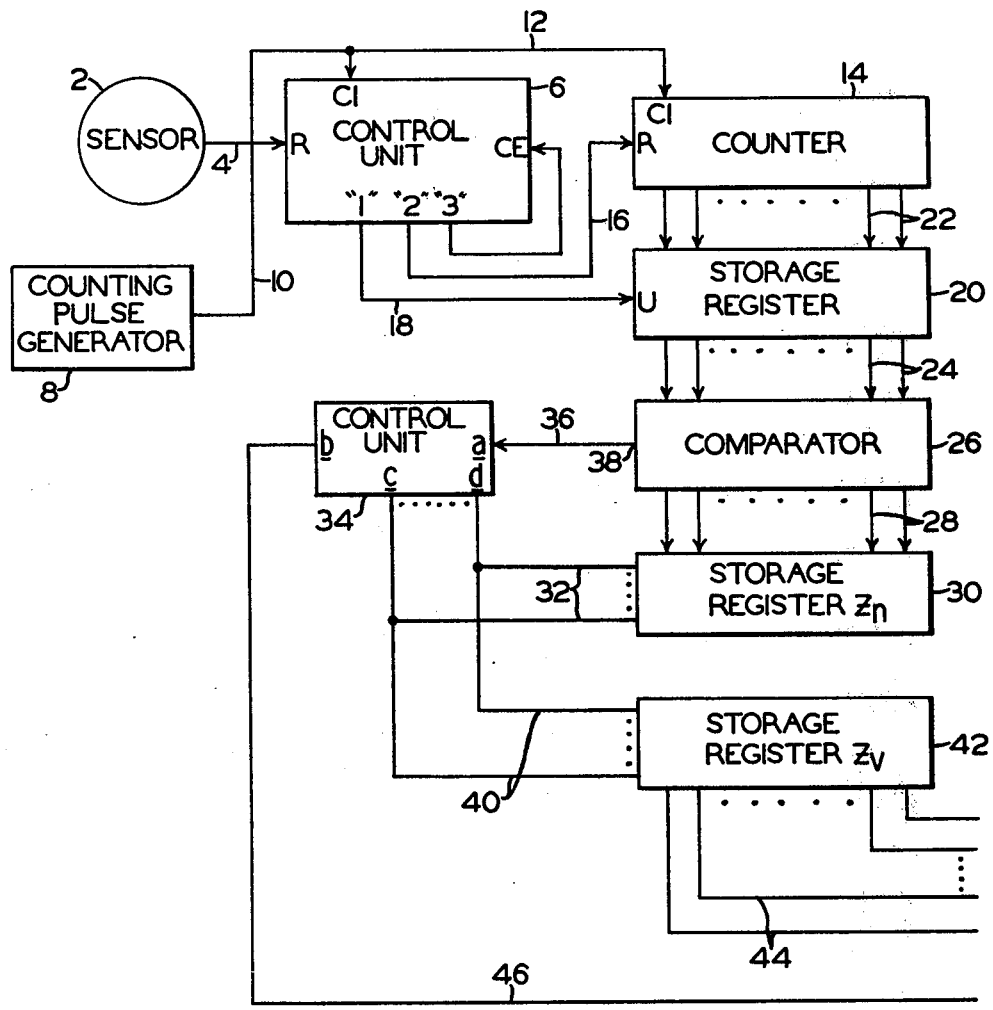
FIG. 1 illustrates a schematic circuit diagram in block form of one embodiment of the present invention.

Referring now to the drawings and in particular to FIG. 1, there is shown a circuit block diagram of a speed measuring system. As shown, a suitable sensing unit or magnetic sensor 2 senses the speed or angular velocity of a rotating wheel (not shown) and produces sinusoidal signals which are transmitted to the reset input terminal R of a control unit 6 via a line 4. If desired or required, it is possible to utilize a suitable sine-square wave converter (not shown) in combination with the sensor 2 to convert the sine waves to square wave signals. It will be appreciated that the control unit 6 may be a one-to-three counting circuit or counter, as is indicated in FIG. 1.

As shown, a counting pulse generator 8 is electrically connected by conductor or line 10 to a count input terminal C1 of the control unit 6. Further, it will be seen that the pulse generator 8 is also connected by line 10 and line 12 to the count input terminal C1 of a multistage binary counter 14.

The control unit 6 is provided with first, second and third count output terminals "1", "2" and "3" and also includes a clock-enable input terminal CE. The second count output terminal "2" of the control unit 6 is connected to a reset input terminal R of the counter 14 by line 16. The first count output terminal "1" of the control unit 6 is connected by a line 18 to a transfer input terminal U of a first storage unit 20. The input terminals of the storage 20 are connected in parallel with lines 22 by the appropriate output terminals of the multi-stage counter 14. The storage 20 is preferably a multi-stage shift register. The output terminals of the storage register 20 are connected by leads or lines 24 to the input terminals of an electronic comparator 26. The output of comparator 26 is connected to the input of a second storage register 30 via lines 28. A plurality of reference values $z_n$, which are associated with predetermined speed intervals of a certain speed measuring range, are stored in the second storage register 30. The storage register 30 is connected via lines 32 to the control outputs c to d of another control unit 34. An input a of control unit 34 is connected by line 36 to the output 38 of the comparator 26. In addition, the outputs c to d of the control unit 34 are connected by lines 40 to the inputs of a third storage register 42. A plurality of speed values $z_v$ are stored in register 42 which correspond to the values $z_n$ and which can be recalled via the output lines 44. Further, for the purpose of indicating and making available the speed value obtained for further processing, the control unit 34 is provided with a control output b for providing a control signal via a line 46.

The speed measuring circuit arrangement which is illustrated in FIG. 1 functions in the following manner.

Let us assume that a high signal is transmitted from sensor 2 to the reset input terminal R so that the control unit 6 is reset for the duration of the high signal. When the following low signal from the sensor enters, the reset pulse disappears and the control unit 6 is set and starts to count the pulses coming from the counting pulse generator 8 which enter at the count input terminal C1. The first count output "1" is set by the positive edge of the first counting pulse, and there is produced a control signal which enables the storage 20 to accept the count result from the counter 14. The second count output "2" control unit 6 is set and the first count output "1" reset by the positive edge of the second counting pulse. On the count output "2", there appears a high signal which resets the counter 14 via the line 16. The count output "2" is reset by the positive edge of the third counting pulse on the count input C1 of the control unit 6, and as a result the reset signal at terminal R of the counter 14 disappears so that the counter 14 starts to count again. At the same time, the third count output "3" is set which is connected with the clock-enabling input terminal CE of the control unit 6 via which input the further counting pulses are blocked, thus ending the counting operation of the control unit 6. Thus, the control unit 6 stops or ceases to count at the number "3" until it is reset again by the following high signal supplied by the sensor 2 and is set for renewed counting by the following low signal.

After the count result of the counter 14 has been stored in the storage register 20, the comparator 26 successively compares this count result with the reference values $z_n$ stored in the storage register 30. These comparing operations are controlled by the control unit 34 via the lines 32 which are connected between outputs c to d to the storage register 30. In practice, the comparisons are carried out serially or according to a special method, e.g. the method of successive approximation.

The result of the comparison is communicated each time to the control unit 34 via the line 36, and the control unit 34 evaluates the decision and determines whether the contents of storage register 20 are smaller than contents of storage register 30 or whether the contents of storage register 20 are larger than or equal to contents of storage register 30. The comparison continues via the control outputs c to d and causes the next comparative number to appear on the outputs of the storage register 30 until the comparative number present on the outputs of the storage register 30 is greater than the contents of the storage register 20 or is equal to the contents. In the latter case, a change in potential takes place on the control output b of the control unit 34, and the corresponding control signal indicates that the speed value $z_v$, which is associated with the reference value $z_n$ found and which is stored in the storage register 42, can be used for further processing and be recalled on the output lines 44.

The present invention will be explained in greater detail hereinafter with reference to a practical example.

It will be seen that the period or cycle duration of the sensor signal frequency is measured by counting the number of pulses of a constant frequency f. The pulse counts $z_s$ obtained at the end of the cycle or period are stored in the storage register 20.

It will be appreciated that the angular speed $v_s$ of the vehicle wheel is inversely proportional to the cycle duration $T_s$ of the sensor signal frequency. The pulse count $z_s$ obtained during the sensor signal cycle $T_s$ is obtained as follows:

$$z_s = T_s \cdot f, \text{ where } T_s = \frac{1}{v_s \cdot K}, \text{ and}$$

$v_s$ being the angular speed, K being a constant, and f being the frequency of the constant signal pulses. Thus, a given speed value $v_s$ can be assigned to each pulse count value $z_s$. This can take place by dividing or, as in the case of the present invention, by comparing with referencec count values $z_n$ which are assigned to predetermined speed values and which correspond to certain speed intervals of a preset speed measuring range. Accordingly, the number of selected values $z_n$ determines and is proportional to the number of possibilities of differentiation. If, for instance, only one value $z_n$ is chosen or preset, then it is only possible to determine whether the value $z_s$ measured is greater or smaller than the reference value $z_n$ by comparison analysis.

If, for example, an 0.25 km/h increment or differential interval in speed is chosen or required, then this means that it is necessary to distinguish between, for instance, a speed of 100 km/h and a speed of 99.75 km/h.

Since the value of the counting pulse frequency f is preselected and known, the values of z for 100 km/h and of z for 99.75 km/h can be computed and stored together with the corresponding other values of the speed measuring range. That is, values $z_1, z_2 \ldots z_n$ corresponding to speeds 1 km/h, mkm/h . . . nkm/h are stored, for example, in fixed storage register 30 in FIG. 1. If the pulse count $z_s$ is obtained and it lies between these predetermined values, it is assigned to one of these values, preferably to the greater value of the interval limited by the values. The value $z_v = v/0.25$ is then assigned to this increment or interval, if appropriate, but is understood that other values may be assigned to $z_v$, if desired. In the present example, the value $z_v$ is selected to be equal to 399. This value is also stored for the purpose of further processing in the storage register 42.

If the total speed measuring range is fixed between 0 km/h to 128 km/h with a possibility of differentiation or quantization of 0.25 km/h, then the number $z_s$ is to be assigned to one of $128 \div 0.25 = 512$ numbers $z_n$. Further 512 numbers $z_v$ are assigned to said 512 numbers $z_n$.

In the present example, a maximum of 512 comparisons would therefore have to be carried out. In order to reduce the number of comparisons, it is possible as is also provided for by the invention to use the method of successive approximation, whereby the number of comparisons would be reduced to 9, since $512 = 2^9$. The amount of storage or memory necessary for the comparison process would have to contain $2 \times 512$ digital numbers. It will be appreciated that the length of the binary number, i.e., the number of storage places, then depends on the lowest speed to be processed so that if this speed should, for example, be 2 km/h, 16 digits would be required.

In order to reduce the number of required binary storage stages, the means and method as shown and described in our copending U.S. Patent, Ser. No. 819,312, filed July 27, 1977, now U.S. Pat. No. 4,125,295, and assigned to the same, may be used in the subject invention.

The comparison operation described heretofore only needs to be performed in the range of $v_{max}$ to $\frac{1}{2}v_{max}$ since, as a result of the transformation processes according to the above-noted U.S. patent application, all the numbers $z_s^* = z_s/2^n$ lie within the range of $z_{s\ min}$ to $2\ z_{s\ min}$. Thus, there are for instance just ten-digit numbers where $z_s$ is the result of count without transformation $z_s^*$ is the result of count with transformation.

Furthermore, in the case of the same possibility of differentiation or quantization, only a supply of $2 \times 256$ numbers would be required. Also, in the case of transformation, the amount of storage which would be necessary is half as large as in the case without transformation.

If a number $z_s$ has been transformed, the associated number $z_v$ is to be likewise transformed.

If the associated number $z_v$ is not transformed, the numbers $z_v$, which were assigned to preceding cycle durations or correspond to the vehicle speed, must be transformed by multiplication. Thus, a quantization jump divided by the same transformation value, e.g. from 0.25 km/h to 0.125 km/h etc. is obtained, which in certain cases may be favorable.

Figure 2:
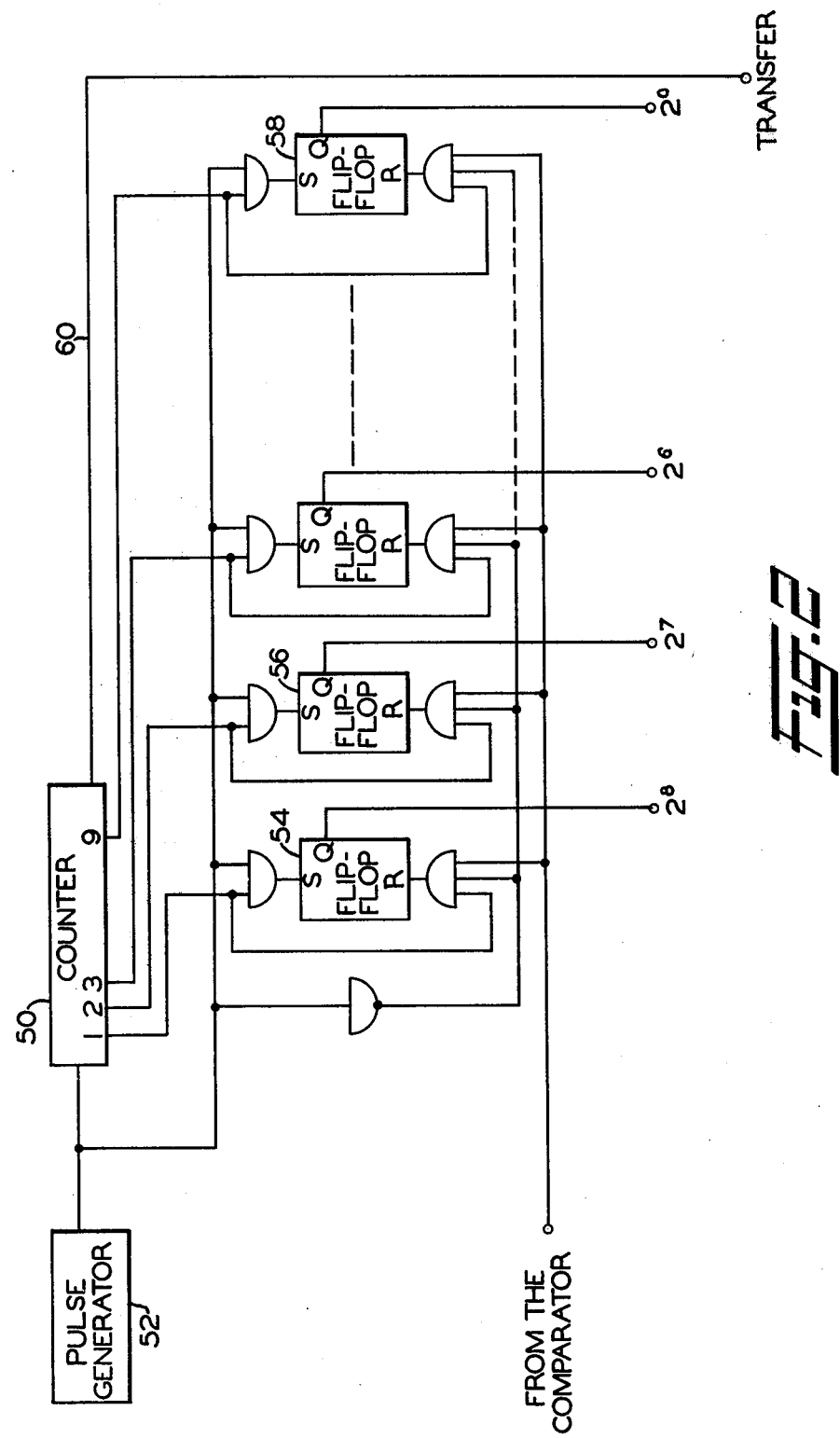
FIG. 2 is a more detailed diagram of the control unit provided in the embodiment of FIG. 1.

Reference is now made to FIG. 2, wherein the control unit 34 of FIG. 1 is schematically shown in more detail. The control unit 34 according to FIG. 2 serves the address preparation according to the method of successive approximation which is employed in accordance with the invention.

A decimal counter 50 receives synchronizing pulses from a synchronizing-pulse generator 52 and counts the number of comparison steps. The comparison takes place digit by digit and starts with the highest bit; for example, in the case of a value of $511 = 2^9 - 1$, upon which the arrangement of FIG. 2 is based. Thus, the first $2^8$ stage is set, i.e., the flip-flop 54 associated with the highest bit. Therefore, the comparison operation takes place. In case the number is greater than 256, the $2^8$ stage, namely, flip-flop 54 remains set; however, if the number is smaller, $2^8$ flip-flop stage 54 is reset. The step counter 50 goes one step further and there occurs a "high" signal on the count output "2". The setting of $2^7$ flip-flop stage 56 takes place following the comparison to determine whether the number is greater or smaller than 128. In cases where the number is smaller than 128, the resetting of $2^7$ stage takes place. This process is continued through stages 57 ... 58 until the last address place is reached. The binary value then present indicates the address for the speed value associated with the cycle duration. After the last comparison in flip-flop stage 58 has taken place, the step counter 50 provides a signal via a line 60 which serves as a transfer signal for the storage for a subsequent electronic device.

Figure 3:
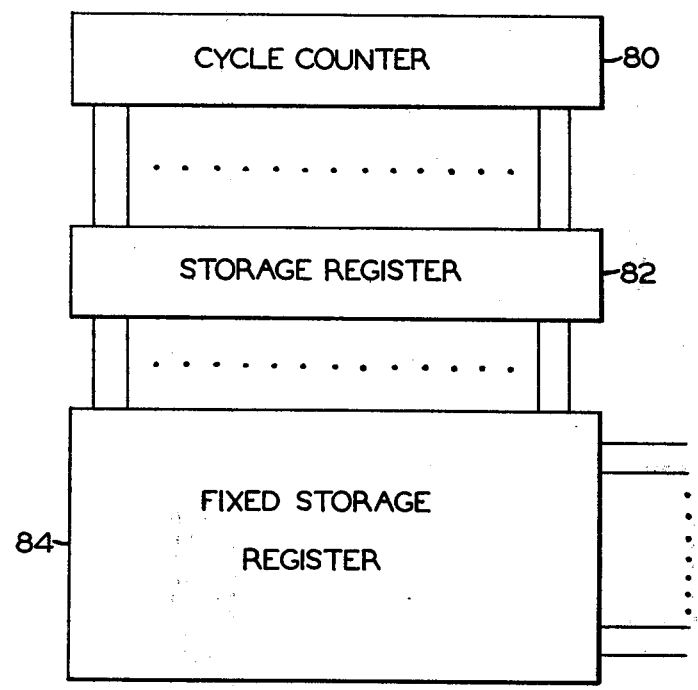
FIG. 3 is a block diagram of another embodiment of the invention.

Reference is now made to FIG. 3 which shows a block diagram of another embodiment of the invention which functions as follows.

The cycle duration is ascertained in a known manner (cf. FIG. 1) by means of a cycle counter 80 and the result is stored in a storage register 82. The measured cycle-duration value present on a fixed storage register 84 is in a fixed relation to the associated speed value.

The cycle-duration value is sent to the fixed storage register 84 as an address. The associated speed value is stored in the fixed storage under this address and appears in a short time (access time) on the output of the storage after applying the measured cycle-duration value to the address inputs of the fixed storage.

In this embodiment, space is saved as far as the control part for the finder of the address is concerned; however, for the same output quantization, more space for storage is required in the fixed storage.

An advantage is the short transformation time of the measured cycle-duration value into the speed value which depends only on the access time t of the storage (45 ns $< t <$ 1 us).

It will be appreciated that various changes and modifications may be made to the presently described invention by those skilled in the art, and therefore, it is understood that all alterations, ramifications and equivalents which are within the spirit and scope of the invention are herein meant to be included in the appended claims.

Having now described the invention, what we claim as new and desire to secure by Letters Patent, is:

1. A circuit for digitally measuring the rotational speed of a moving part comprising, sensor means for producing a sensor signal having a frquency proportional to the rotational speed of the moving part, means for measuring the cycle duration value of the sensor signal frequency and for converting the cycle duration value to a representation of the rotational speed, wherein said means includes, means for storing rotational speed values which are graduated and preset within a predetermined speed measuring range, means for storing fixed speed step values which are inversely porportional to the rotational speed values and which are graduated and preset within the predetermined speed measuring range, and means for comparing the cycle duration value with the fixed speed step values and for providing from the means for storing rotational speed values one of two successive rotational speed values when the cycle duration value falls within an interval which is limited by two successive speed step values.

2. The circuit as defined in claim 1, characterized in that an upper interval limiting value is associated with the measured rotational speed value.

3. The circuit as defined in claim 1, characterized in that said means for comparing performs the comparison according to a known method of successive approximation.

4. The circuit as defined in claim 1, characterized in that the rotational speed values are graduated in a binary manner.

5. The circuit as defined in claim 1, characterized in that the required size of the second storage means is reduced when establishing certain evaluation ranges by causing certain transformations to be carried out before performing the comparison operation.

6. The circuit as defined in claim 1, characterized in that said cycle duration value is compared with only one preset number of intervals with the preset number corresponding to a predetermined maximum admissible speed jump.

7. The circuit as defined in claim 1, further characterized by a pulse generator for producing counting pulses, a digital counter for counting the counting pulses which fall within the time duration of a cycle of a sensor signal, an electronic comparator for comparing the respective cycle duration value with preset values which correspond in a specified manner to graduated rotational speed values within a predetermined speed measuring range.

8. The circuit as defined in claim 7, characterized in that said comparator is provided with a storage device wherein the reference values are stored in a manner so that they can be recalled, and said comparator is connected with said storage device in which the comparison between the respective measured value and the stored values takes place, and a control unit is connected to said comparator and said storage device and controls the comparison operations.

9. A circuit as defined in claim 8, characterized in that an additional control unit serves to control the counter in accordance with the input of the sensor signals and which controls a further storage device for the acceptance of the respective count obtained in the counter which represents the measured cycle duration value.

10. A circuit as defined in claim 8, characterized in that said control unit produces control signals which, for the purpose of carrying out the comparison, cause said comparator to accept both the respective measured value from the storage device and, successively, the reference values from the storage device.

11. A circuit as defined in claim 10, characterized in that said control unit controls the comparison operations as a function of the respective comparison result and, when ending the comparison operation, produces a signal by which the speed step value as determined each time it is associated with the cycle duration value and is supplied for the purpose of obtaining the corresponding rotational speed value.

12. A circuit as defined in claim 11, characterized in that the control unit is provided with a counter for counting the comparison steps and is provided with flip-flops which are associated with the individual binary digits and which for the address preparation according to a successive method are set successively when the cycle duration value is greater than the speed step value and are reset when the cycle duration value is smaller than the speed step value as a function of the respective result of the comparison of the digits so that after ending the comparison the digits are representative of a binary value which indicates the address for the rotational speed value associated with the measured cycle duration value.

13. A circuit as defined in claim 12, characterized in that after ending the comparison the counter provides a signal corresponding to the number of comparisons and is in the form of an address transfer signal for a speed value storage.

14. A circuit as defined in claim 1 further characterized by a pulse generator for producing counting pulses, a digital counter for counting the counting pulses which fall within the time duration of a cycle of a sensor signal, a fixed storage having a predetermined number of rotational speed values of a specified speed measuring range stored under addresses which are formed from the associated cycle duration values measured, wherein the signal corresponding to the measured cycle duration value is transmitted directly to the fixed storage so as to determine the rotational speed value.

* * * * *

UNITED STATES PATENT AND TRADEMARK OFFICE
CERTIFICATE OF CORRECTION

PATENT NO. : 4,166,976
DATED : September 4, 1979
INVENTOR(S) : Gerhard Ruhnau and Wolfgang Gudat It is certified that error appears in the above-identified patent and that said Letters Patent are hereby corrected as shown below:

Column 8, line 29, after "a", insert --rotational--

Signed and Sealed this

Twenty-fourth Day of June 1980

[SEAL]

Attest:

SIDNEY A. DIAMOND

Attesting Officer       Commissioner of Patents and Trademarks